United States Patent
Okada

(10) Patent No.: US 7,573,511 B2
(45) Date of Patent: *Aug. 11, 2009

(54) DIGITAL CAMERA

(75) Inventor: Hidefumi Okada, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 592 days.

This patent is subject to a terminal disclaimer.

(21) Appl. No.: 10/992,833

(22) Filed: Nov. 22, 2004

(65) Prior Publication Data

US 2005/0099512 A1    May 12, 2005

Related U.S. Application Data

(62) Division of application No. 09/318,614, filed on May 26, 1999, now Pat. No. 6,897,895.

(30) Foreign Application Priority Data

May 28, 1998 (JP) ................... 10-147544

(51) Int. Cl.
*H04N 5/76* (2006.01)

(52) U.S. Cl. .............. 348/231.99; 348/231.3; 348/231.9

(58) Field of Classification Search .............. 348/231.2, 348/231.3, 231.6, 231.9
See application file for complete search history.

(56) References Cited

U.S. PATENT DOCUMENTS

| | | | |
|---|---|---|---|
| 4,090,223 A | 5/1978 | Holt | 386/117 |
| 4,558,436 A | 12/1985 | Wagensonner et al. | 365/189.04 |
| 4,783,702 A | 11/1988 | Sone et al. | 348/314 |
| 5,130,814 A | 7/1992 | Spencer | 386/109 |
| 5,144,445 A | 9/1992 | Higashitsutsumi | 348/294 |
| 5,164,831 A | 11/1992 | Kuchta et al. | 348/231.7 |
| 5,301,027 A * | 4/1994 | Kiyofuji et al. | 348/589 |
| 5,440,401 A | 8/1995 | Parulski et al. | 386/124 |
| 5,463,419 A * | 10/1995 | Saito | 348/231.9 |
| 5,786,851 A * | 7/1998 | Kondo et al. | 348/222.1 |
| 5,920,343 A * | 7/1999 | Watanabe et al. | 348/222.1 |
| 5,926,219 A * | 7/1999 | Shimizu et al. | 348/222.1 |
| 6,072,936 A | 6/2000 | Koyama | 386/95 |
| 6,438,320 B1 | 8/2002 | Hatanaka | 386/117 |
| 6,441,856 B1 * | 8/2002 | Sugimoto | 348/371 |
| 6,515,704 B1 | 2/2003 | Sato | 348/333.11 |
| 6,618,553 B1 * | 9/2003 | Shiohara | 386/117 |
| 6,897,895 B1 * | 5/2005 | Okada | 348/231.99 |
| 7,174,045 B2 * | 2/2007 | Yokonuma | 348/222.1 |

* cited by examiner

*Primary Examiner*—David L Ometz
*Assistant Examiner*—Luong T Nguyen
(74) *Attorney, Agent, or Firm*—Krantz, Quintos & Hanson, LLP

(57) ABSTRACT

A digital camera includes a CCD imager which outputs 640 pixels×480 lines of camera signal in a raster scan scheme. The camera signal outputted from the CCD imager is subjected to a predetermined signal processing whereby created are 640 pixels×480 lines of original image data and 80 pixels×60 lines of thumbnail image data. Both the created original image data and thumbnail image data are written to a SDRAM. The writing of the thumbnail image data is performed during a horizontal blanking period of the original image data. As a result, image data writing operation completes within a 1-frame period of time.

5 Claims, 8 Drawing Sheets

DIGITAL CAMERA

The application is a divisional application of Ser. No. 09/318,614 filed May 26, 1999 now U.S. Pat. No. 6,897,895, and the contents of the application is hereby incorporated by reference therein.

BACKGROUND OF THE INVENTION

1. Field of the Invention

This invention relates to digital cameras and, more particularly, to a digital camera adapted to record photographic original image data and thumbnail image data corresponding thereto.

2. Description of the Prior Art

Exif is one of recording formats for digital cameras. With this recording format, there is necessity to record not only picture-taking image data (original image data) with desired resolution but also thumbnail image data corresponding to the original image data. Due to this, in the conventional digital camera the CPU has been required to create thumbnail image data from original image data in accordance with a program.

However, where creating such thumbnail image data by using a program, it takes a long time thus increasing the time required to complete one time of picture taking.

SUMMARY OF THE INVENTION

Therefore, it is a primary object of the present invention to provide a digital camera which is capable of reducing a time required for one time of picture taking.

According to the present invention, a digital camera comprises: a picture taking means for taking a subject and outputting original image data by a raster scan scheme; a main memory; an original writing means for writing the original image data to the main memory; a creating means for creating a thumbnail image data based on the original image data; a buffer; a first thumbnail writing means for writing to the buffer thumbnail image data outputted from the creating means; and a second thumbnail writing means for writing to the main memory thumbnail image data stored in the buffer each time a first predetermined lines of original image data is written to the main memory.

If original image data is outputted through a raster scan scheme from the picture taking means, the original writing means write this original image data to the main memory. On the other hand, the creating means creates thumbnail image data based on the original image data outputted from the picture taking means. The created thumbnail image data is once written to the buffer by the first thumbnail writing means. The second thumbnail writing means writes the thumbnail image data stored in the buffer to the main memory each time a first predetermined lines of original image data is written to the main memory.

According to the present invention, the thumbnail data stored in the buffer is written to an SDRAM each time the first predetermined lines of original image data is written to the SDRAM. The writing operation to the SDRAM 1-sheet of original image data and 1-sheet of thumbnail image data completes within a 1-frame period of time. It is therefore possible to reduce a time required for one time of picture taking.

In a certain aspect of the present invention, a second predetermines lines of thumbnail image data is associated with the first predetermined lines of original image data, and the buffer including a thumbnail area to store the second predetermined lines of thumbnail image data.

In another aspect of the present invention, a horizontal counter counts a horizontal number of pixels of the original image data and outputs a horizontal count value, and a vertical counter counts a vertical number of lines of the original image data and outputs a vertical count value.

In one embodiment of the present invention, the creating means includes an extracting means to extract predetermined pixel data from the original image data based on the horizontal count value and the vertical count value. The extracting means includes a plurality of registers to shift the original image data by a predetermined number of pixels a time and an enabling means to intermittently enable the registers based on the horizontal count value and the vertical count value.

In another embodiment of the present invention, the first thumbnail writing means includes a data writing means. This data writing means writes the thumbnail image data to the buffer based on the horizontal count value and the vertical count value.

In still another embodiment of the present invention, the first thumbnail writing means includes a request output means. The request output means outputs a request to read out the thumbnail image data when the vertical counter counts up the number of lines corresponding to the first predetermined lines and the horizontal counter counts up the horizontal number of pixels on the original image data. The second thumbnail writing means includes a thumbnail reading means to read the thumbnail image data out of the buffer in response to the read request.

In further aspect of the present invention, the original writing means includes a first original writing means to write the original image data by a predetermined number of pixels a time, and a second original writing means to write original image data stored in the buffer to the main memory by the predetermined number of pixels a time.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
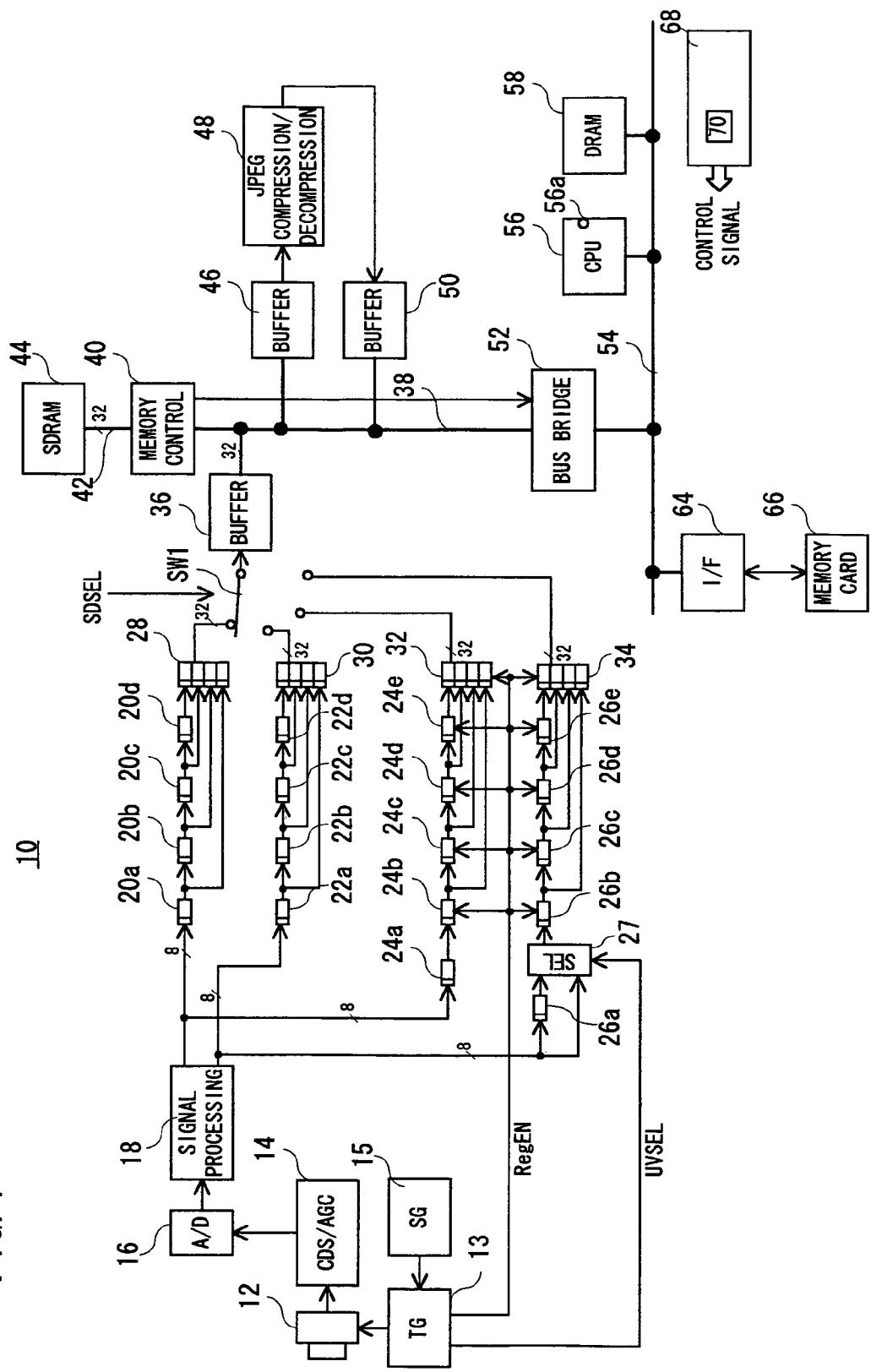
FIG. 1 is a block diagram showing one embodiment of the present invention.

Referring to FIG. 1, a digital camera 10 in this embodiment includes a CCD imager 12 which has the effective number of pixels of horizontally 640 pixels by vertically 480 lines. The CCD imager 12 is mounted, at its front, with a primary color filter (not shown) so that a subject optical image is given to the CCD imager 12 through this primary color filter.

If a shutter button 70 is operated, a system controller 68 supplies a control signal to a CPU 56 via an interrupt terminal 56a. The CPU 56, when a 1-frame time period has elapsed from operating the shutter button 70, disables the CCD imager 12. In concrete, a timing generator 13 is suspended from reading charges from the CCD imager 12. As a result, after operating the shutter button 70, 1 frame of camera signal only is outputted from the CCD imager 12.

The outputted camera signal is a progressive scan signal having any one of R, G and B primary color components on each pixel. This camera signal is subjected to well-known noise removal and level adjustment by a CDS/AGC circuit 14, and then converted into digital-signal camera data by an A/D converter 16 operating at a clock rate of 12 MHz. A signal processing circuit 18 performs YUV conversion with a ratio of 4:2:2 on the camera data outputted from the A/D converter 16, thereby creating YUV data, or original data having 640 pixels×480 lines.

Incidentally, the timing generator 13 creates a timing signal based on horizontal and vertical synchronizing signals outputted from a signal generator 15, to drive the CCD imager 12 by a progressive scan scheme.

Figure 4:
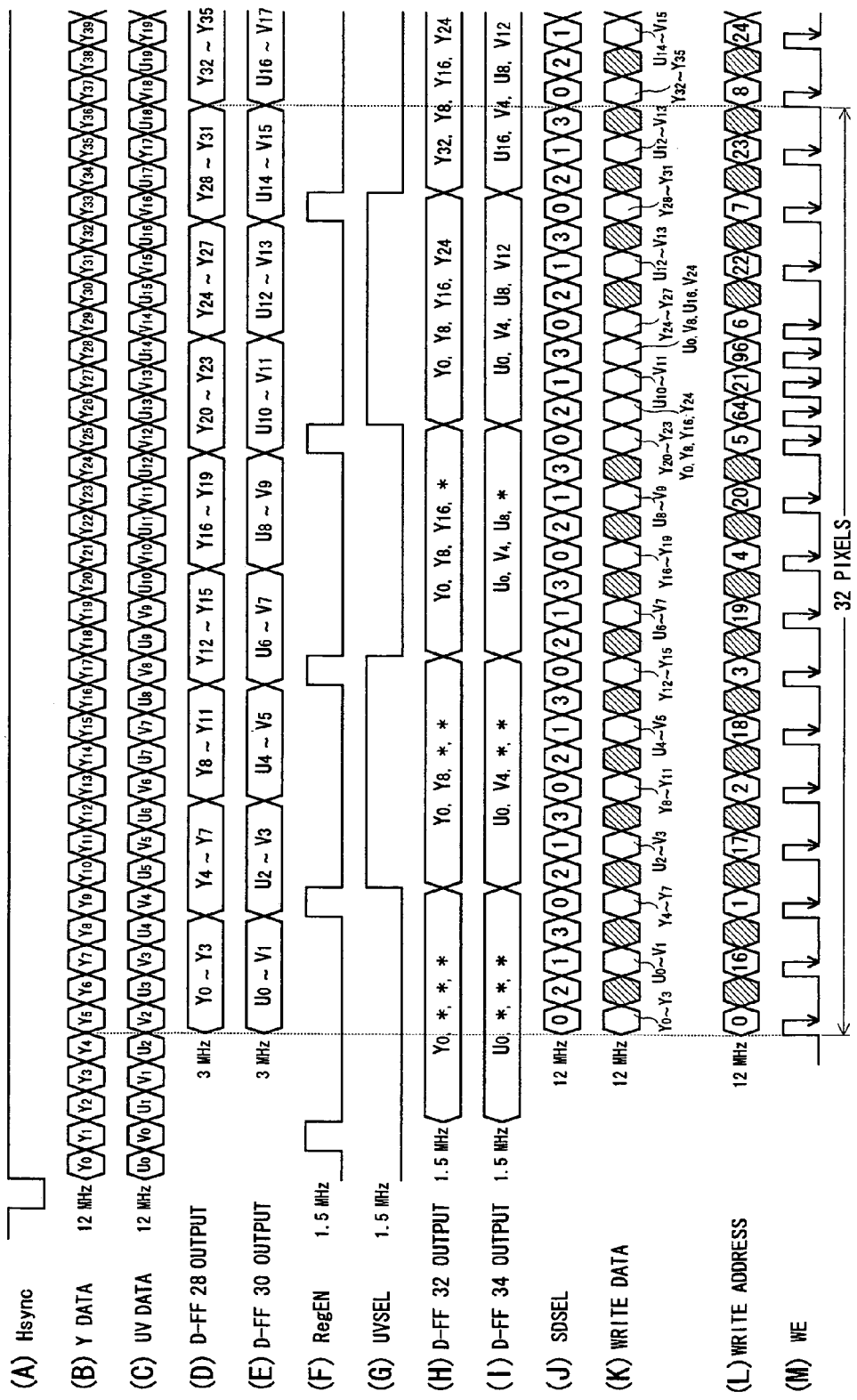
FIG. 4 is a timing chart showing one part of operation of the FIG. 1 embodiment.

The signal processing circuit 18 also carries out a signal processing as described above at the clock rate 12 MHz, in response to the horizontal and vertical synchronizing signals from the signal generator 15. As a result, Y data as shown in FIG. 4(B) and UV data as shown in FIG. 4(C) are simultaneously outputted through respective two signal routes. Incidentally, each of the Y data, U data and V data has 8 bits per pixel.

The Y data is inputted, on a pixel-by-pixel basis, to four D-FF circuits 20a-d20d that are in serial connection. The D-FF circuits 20a-20d has their outputs to be simultaneously inputted to a D-FF circuit 28. That is, 4 pixels in a horizontal direction, or 32 bits, of Y data are simultaneously inputted to the D-FF circuit 28. On the other hand, U data and V data are outputted alternately from the signal processing circuit 18, every 8 bits. Due to the conversion of 4:2:2, the Y data and the V data each have a data amount of a half of that ½ of the Y data. Accordingly, in a duration that 4 pixels of Y data are outputted through one signal route, 2 pixels of Y data and 2 pixels of V data are outputted through the other signal route. The 2 pixels of UV data are also simultaneously inputted to a D-FF circuit 30 via D-FF circuits 22a-22d. The D-FF circuits 28 and 30 operate at a clock rate of 3 MHz so that Y data and UV data are respectively outputted from the D-FF circuits 28 and 30 in timing as shown in FIG. 4(D) and (E) and every 32 bits.

The Y data outputted from the signal processing circuit 18 is also inputted with a 1-pixel delay to a D-FF circuit 24b by way of a D-FF circuit 24a which is enabled at all times and operates at the clock rate 12 MHz. The D-FF circuit 24b as well as D-FF circuits 24c-24e connected serial in the rear stage are to be enabled by an enable signal RegEN outputted from the timing generator 13. That is, these circuits latch input data responsive to a 12-MHz clock only while the enable signal RegEN shown in FIG. 4(F) is high in level. The respective ones of Y data latched by these D-FF circuits 24b-24e are simultaneously inputted to a D-FF circuit 32 where they are latched responsive to the same enable signal RegEN.

As can be understood from FIG. 4(F), the enable signal RegEN rises every 8 pixels with a result that Y data is inputted once per 8 pixels to the D-FF circuit 32. That is, 1 pixel of Y data is extracted from among consecutive 8-pixels Y data. The D-FF circuit 32 also responds to the enable signal RegEN and latches input data corresponding to predetermined 4 pixels.

As a result, Y data each having 8 pixels is outputted in timing as shown in FIG. 4(H) from the D-FF circuit 32. Incidentally, with respect to a vertical direction, operation is once per 8 lines or more.

The UV data outputted from the signal processing circuit 18 is inputted to a selector 27 directly or via a D-FF circuit 26a. The D-FF circuit 26a is enabled at all times to operate at the 12-MHz clock rate whereby the Y data and V data of same pixels are simultaneously inputted to the selector 27. The selector 27 selects any of input data depending on a select signal UVSEL to be outputted from the timing generator 13. The selector 27 is serially connected with D-FF circuits 26b-26e each of which latches input data responsive to the 12-MHz clock only when the enable signal RegEN is at a high level. A D-FF circuit 34 also latches input data in response to the enable signal RegEN. As a result, the D-FF circuits 26b-26e have respective outputs to be simultaneously outputted through the D-FF circuit 34.

The select signal UVSEL varies in level every 8 pixels, as shown in FIG. 4(G). If the select signal UVSEL is at a low level, the selector 27 selects an output of the D-FF circuit 26a. When the select signal UVSEL is at a high level, the selector 27 selects an output of the signal processing circuit 18. The enable signal RegEN rises only once per 8 pixels as stated before. As a result, the U data and the V data are alternatively latched by each of the D-FF circuits 26b-26e. That is, the U data and the V data are alternately extracted every 8 pixels. The extracted UV data corresponding to predetermined 4 pixels is outputted in timing as shown in FIG. 4(I) from the D-FF circuit 34. Incidentally, with respect to the vertical direction, the above operation is carried out every 8 lines also on the UV data.

In this manner, pixel data is extracted every 8 pixels and lines respectively in the horizontal and vertical directions. As a result, thumbnail image data formed by 80 pixels×60 lines is created from 640 pixels×480 lines of original image data.

A switch SW1 is switched in accordance with a select signal SDSEL outputted from the timing generator 13. That is, if the select signal SDSEL is at "0", the switch SW1 is connected to the D-FF circuit 28. If the select switch SDSEL is at "1", the switch SW1 is connected to the D-FF circuit 30. Also, when the select signal SDSEL assumes "2" and "3", the switch SW1 is connected respectively to the D-FF circuits 32 and 34. The select signal SDSEL responds to the 12-MHz clock and varies in the order of "0", "2", "1" and "3", as shown in FIG. 4(J). As a result, outputs are selected in the order of the D-FF circuit 28, D-FF circuit 32, D-FF circuit 30 and D-FF circuit 34. Thus, original image data and thumbnail image data are outputted in timing shown in FIG. 4(K) through the switch SW1.

The connections of the switch SW1 to the D-FF circuits 32 and 34 are respectively effective only during a time period that the Y data and UV data corresponding to the predetermined 4 pixels are respectively outputted from the D-FF circuits 32 and 34. For this reason, in FIG. 4(K) the outputs of the switch SW1 during ineffective connection are shown by hatching. As can be understood from FIG. 4(K), in a duration that 32-pixels original image data is outputted through the switch SW1, 4 pixels of thumbnail image data associated with that 32 pixels are outputted through the switch SW1.

Figure 3:
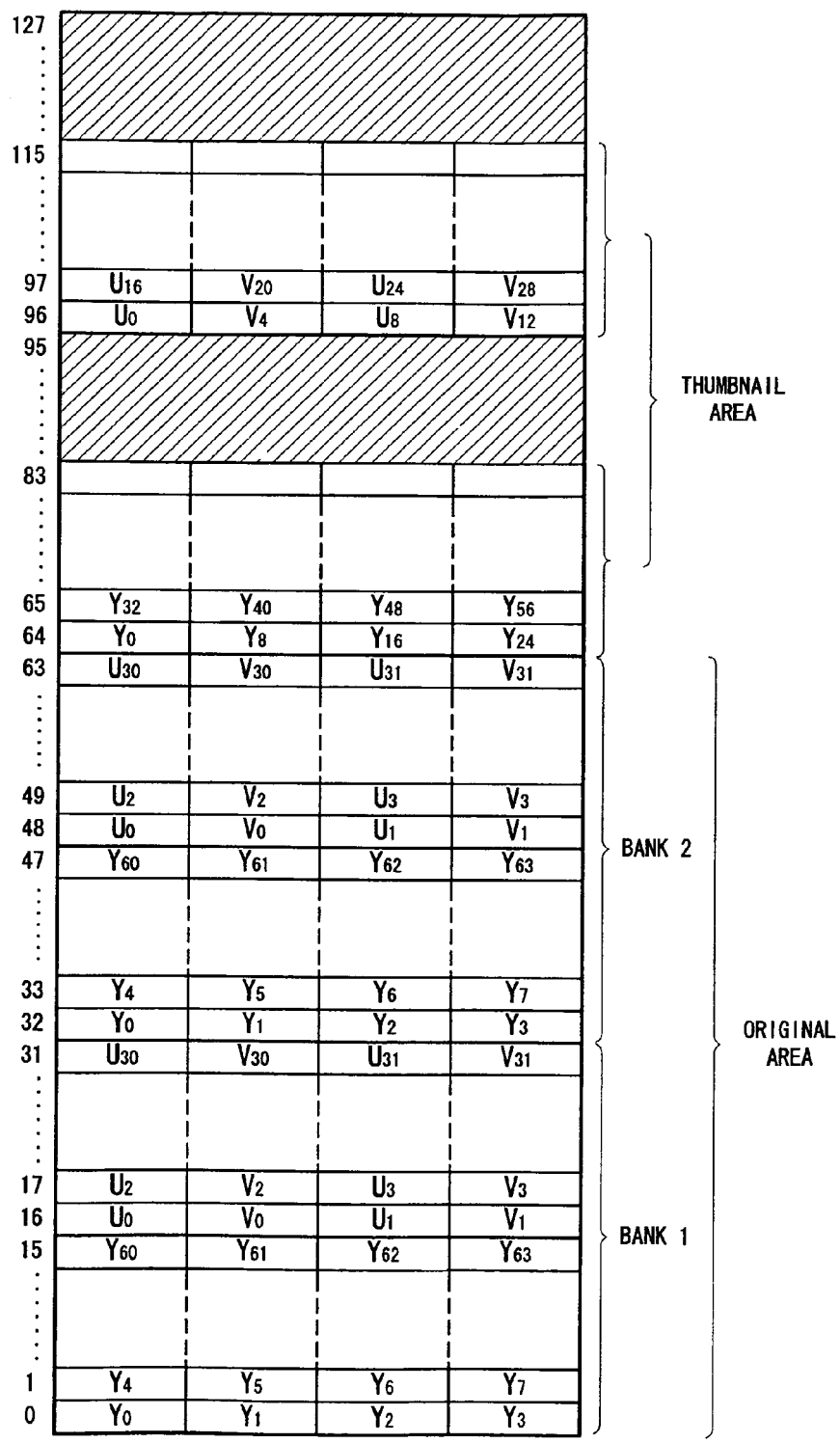
FIG. 3 is an illustrative view showing a buffer.

A buffer 36 is configured by an SRAM with dual ports, as shown in FIG. 3. The SRAM has a total word number of "128". A former half of 64 words constitutes an original area to store original image data, while a latter half of 64 words includes predetermined 40 words constituting a thumbnail area to store thumbnail image data.

Explaining in greater detail, each word has a 32-bit width of 32 bits. The original area assigned with addresses "0"-"63" is divided into two banks. That is, each bank can store 64 pixels of YUV data. Accordingly, the original image data outputted through the switch SW1 is alternately written by 64 pixels a time onto the banks 1 or 2. Read out is carried out from a bank not being written thereon.

On the other hand, thumbnail image data is stored to an address "64"-"83" and address "96"-"115". This area with capacity of totally 40 words is given as a thumbnail area. In also the thumbnail area each word has a width of 32 bits and the Y data or UV data corresponding to predetermined 4 pixels is written onto 1 word. Specifically, Y data is written onto 20 words of the addresses "64"-"83", while UV data is onto 20 words of the addresses "96"-"115". In this manner 80-pixels, or 1-line, thumbnail image data is written to the thumbnail area.

The timing generator 13 also provides a write address signal shown in FIG. 4(L) and a write enable signal shown in FIG. 4(M) to the buffer 36. By varying the select signal SDSEL as shown in FIG. 4(J), the original image data and the thumbnail image data are outputted in the timing shown in FIG. 4(K) from the switch SW1. Due to this, the output timing of the write enable signal varies from 12 MHz to 24 MHz only when effective thumbnail image data is being outputted. As a result, the original image data and the thumbnail image data are written to write addresses shown in FIG. 4(L). In this manner, in a duration that the 32-pixels original image data is written to the original area, the associated 4-pixels thumbnail image data is written to the thumbnail area.

Figure 7:
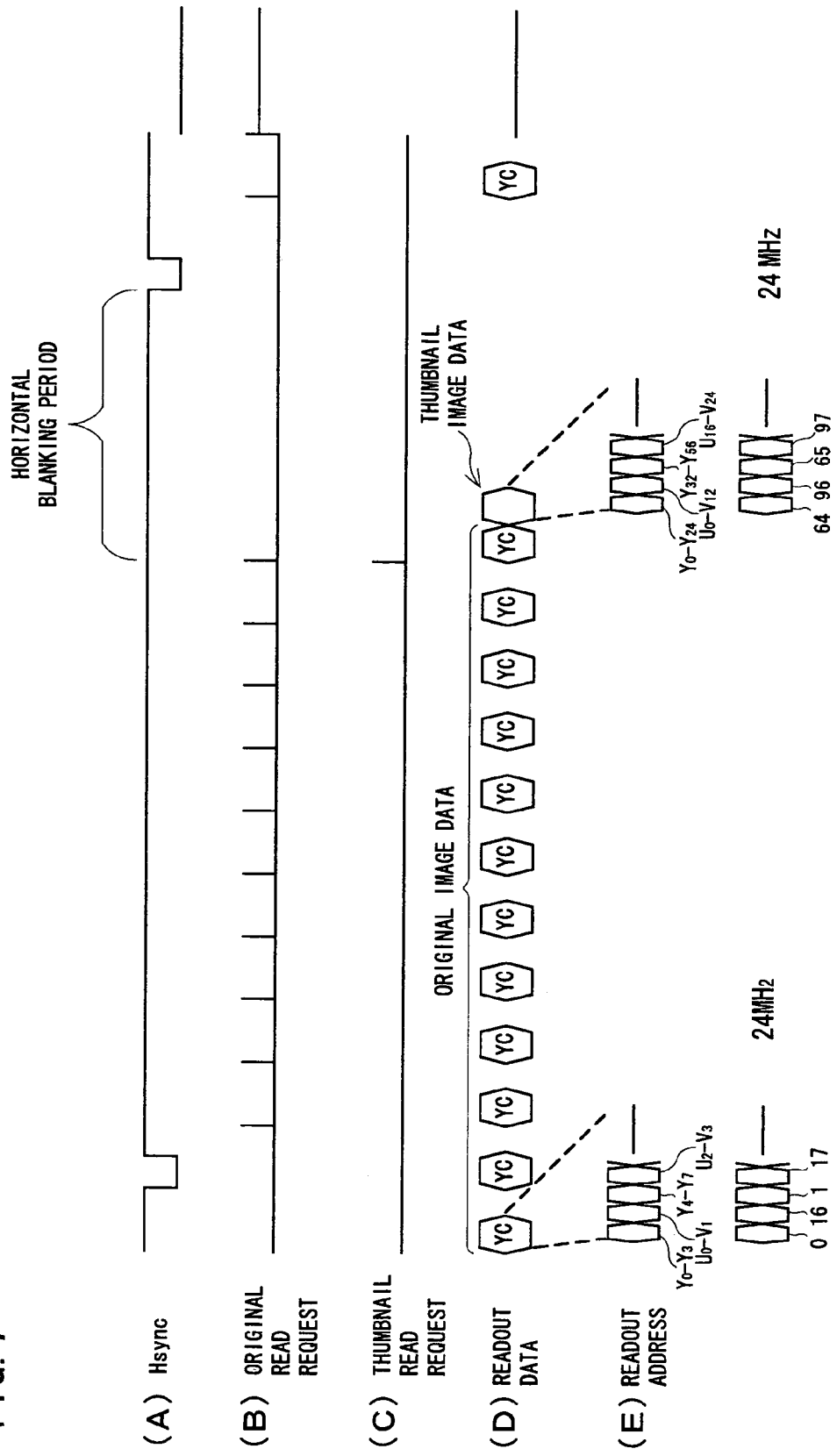
FIG. 7 is a timing chart showing another part of operation of the FIG. 1 embodiment.

The 64-pixels original image data written in one bank of the original area is read out in concurrent with the writing of the succeeding 64-pixels original image data onto the other bank. Specifically, the timing generator 13 provides an original read request shown in FIG. 7(B) to the memory control circuit 40. The memory control circuit 40, in turn, reads original image data out of a predetermined bank in response to this original read request. The memory control circuit 40, as shown in FIG. 7(E), outputs an address signal at a rate of 24 MHz and reads original data from the original area as shown in FIG. 7(D).

Figure 5:
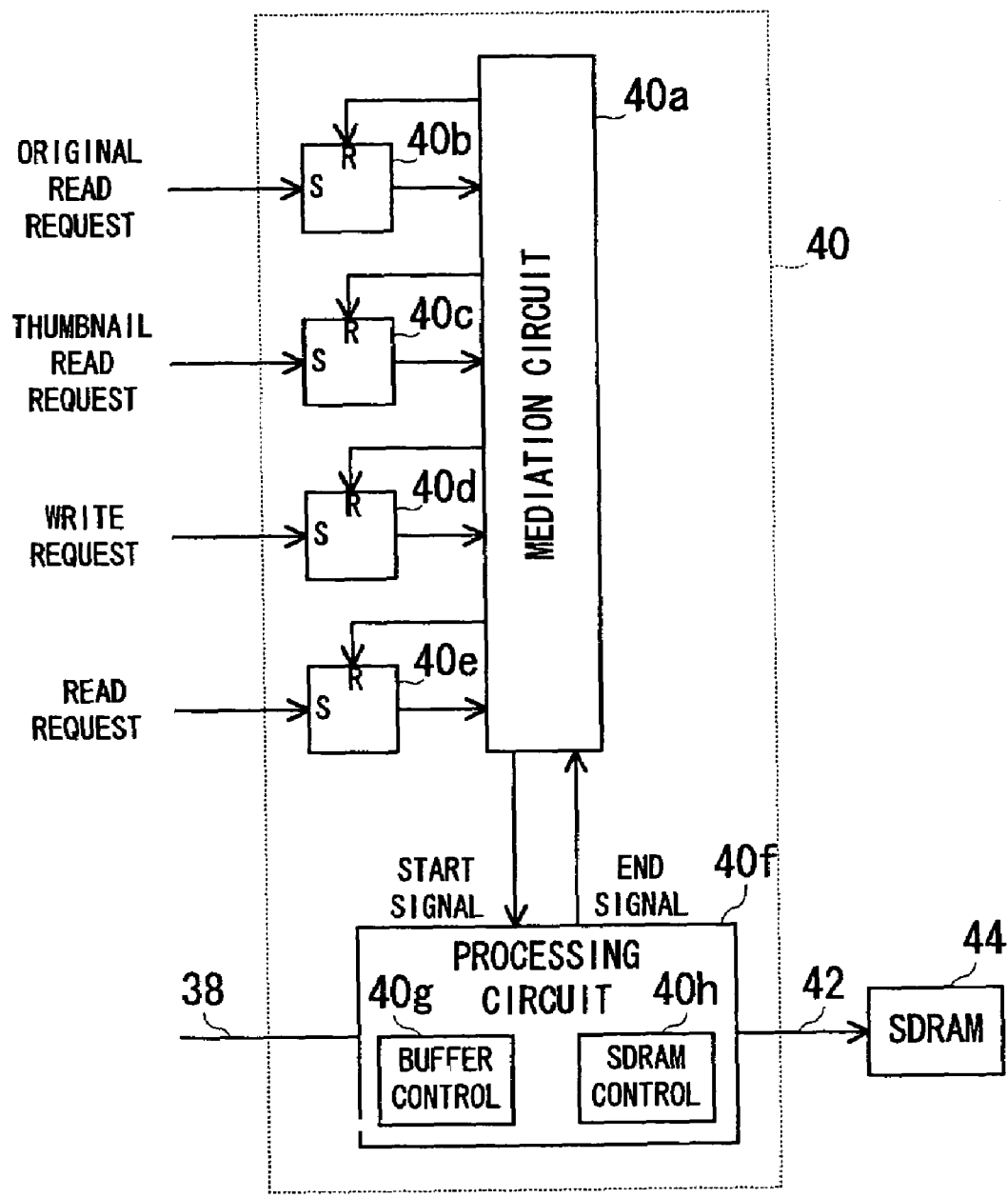
FIG. 5 is a block diagram showing a memory control circuit.

Referring to FIG. 5, the original read request is inputted to a mediation circuit 40a through the RS-FF circuit 40b. The mediation circuit 40a also receives other requests from the RS-FF circuits 40c-40e and mediates between the requests. In order to respond to any of the requests, the mediation circuit 40a outputs a predetermined start signal to a processing circuit 40f.

Figure 6:
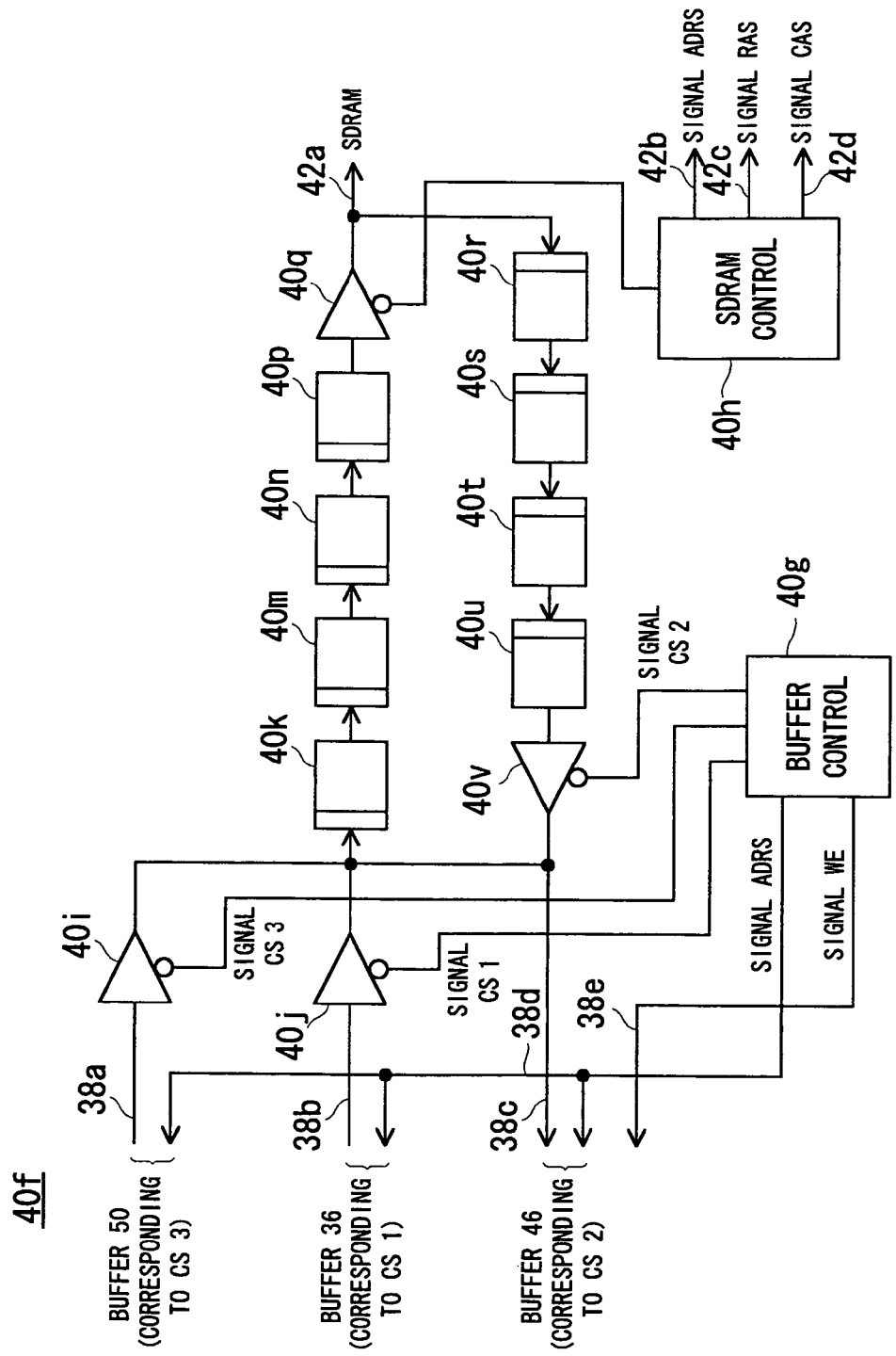
FIG. 6 is a block diagram showing one part of the FIG. 5 embodiment.

The processing circuit 40f is configured as shown in FIG. 6. A bus 38 includes data buses 38a-38c, an address bus 38d and a control bus 38e. The data buses 38a and 38b are respectively connected to input terminals of 3-state buffers 40i and 40j. The data bus 38c is commonly connected to the output terminals of the 3-state buffers 40i, 40j and the input terminal of the D-FF circuit 40k. The address bus 38d and the control bus 38e are connected to the buffer control circuit 40g.

D-FF circuits 40k and 40p are in serial connection. The D-FF circuit 40p has an output terminal connected to an input terminal of a 3-state buffer 49. The 3-state buffer 49 has an output terminal connected to an SDRAM (synchronous DRAM) 44 through a data bus 42a included in a bus 42. D-FF circuits 40r-40u serially connected one another are inserted between the output terminal of the 3-state buffer 49 and an input terminal of a 3-state buffer 40v. The 3-state buffers 40i, 40j and 40v are turned on/off by a buffer control circuit 40g, while the 3-state buffer 49 is turned on/off by an SDRAM control circuit 40h.

Figure 8:
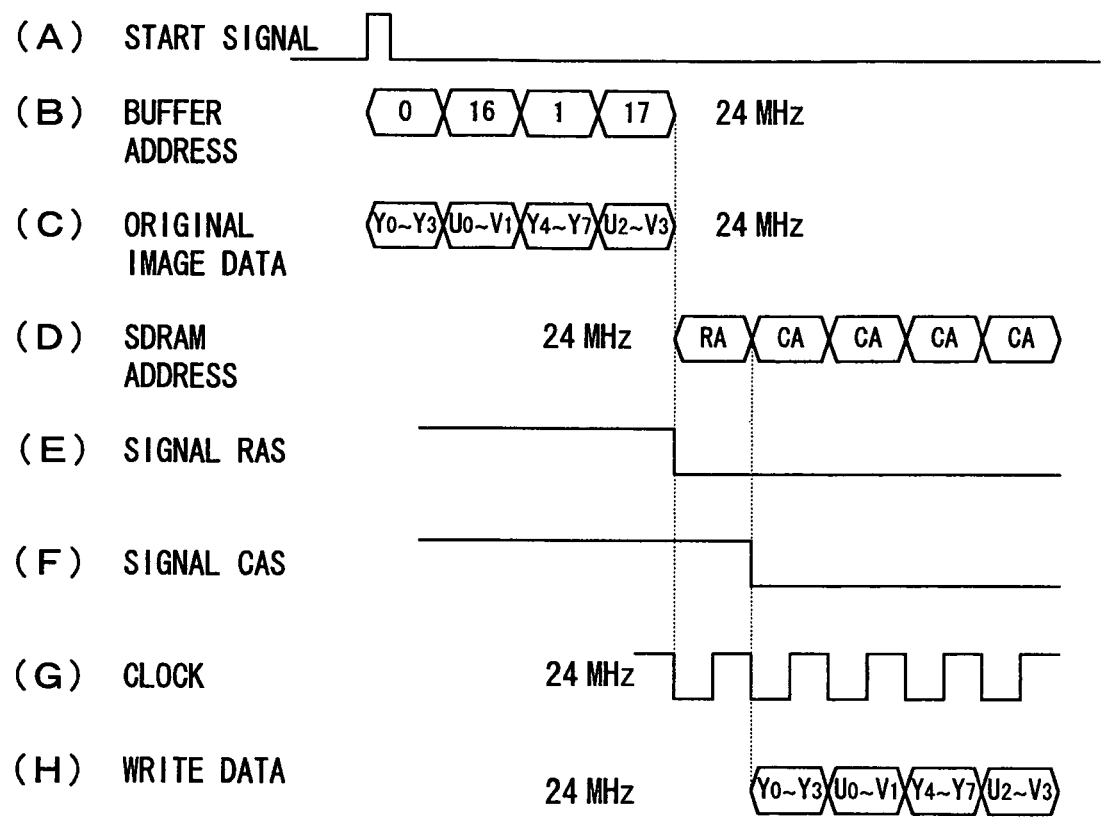
FIG. 8 is a timing chart showing another part of operation of the FIG. 1 embodiment.

When processing an original read request from the timing generator 13, the processing circuit 40f outputs an address signal shown in FIG. 8(B) to the buffer 36 in response to a start signal shown in FIG. 8(A), and reads original image data (YUV data) shown in FIG. 8(C) from the original area of the buffer 36. The read YUV data is written by DMA (Direct Memory Access) to the SDRAM 44. At this time, the processing circuit 40f carries out the processing at the 24-MHz clock rate.

Explaining in detail, the buffer control circuit 40g outputs the above address signal via an address bus 38d, and making a chip select signal CS1 low in level and turn on the 3-state buffer 40j. Furthermore, the SDRAM control circuit 40h causes the 3-state buffer 49 to turn on. Due to this, the original image data read from the buffer 36 is outputted in timing shown in FIG. 8(H) to the SDRAM 44 via the D-FF circuits 40k-40p. That is, because four D-FF circuits 40k-40p are interposed between the 3-state buffers 40i and 40q, the fetched YUV data is outputted with a 4-clock delay to the SDRAM 44.

The SDRAM control circuit 40h also outputs an address signal, RAS signal and CAS signal shown in FIG. 8(D)-(F) to the SDRAM 44. The address signal is outputted to the SDRAM 44 through an address bus 42b, while the RAS signal and the CAS signal are outputted through control busses 42c and 42d. The address signal first designates a row address and then designates, during a succeeding 4-clock time period, a column address. The RAS signal falls simultaneously with the designation of a row address, whereas the CAS signal falls at a time point that a column address is designated. This causes the SDRAM 44 to acknowledge 4 addresses and writes 32 bits per address the YUV data shown in FIG. 6(H) to desired 4 addresses. This operation is carries out for 64 pixels.

The processing circuit 40f supplies an end signal to the mediation circuit 32a each time 64-pixels original image data writing has been completed. The mediation circuit 32a enters to a process for a next request. By processing 10 times an original read request from the timing generator 13 in this manner, 640 pixels or 1 line of original image data are written to the SDRAM 44. If the original read request is repeated 480 times, 1 screen of original image data is obtained within the SDRAM 44.

The timing generator 13 outputs a thumbnail read request each time 80 pixels of thumbnail image data are obtained within the buffer 36 or at an interval of 8 lines. The thumbnail read request is outputted simultaneous with a 10-th original read request for a predetermined line as shown in FIG. 7(C), which is supplied to an RS-FF circuit 40c shown in FIG. 5. The mediation circuit 40a processes the thumbnail read request following the 10-th original read request. In processing the thumbnail read request, a predetermined start signal is also supplied from the mediation circuit 40a to the processing circuit 40f. The buffer control circuit 40g supplies an address signal shown in FIG. 7(E) to the buffer 36. Due to this, thumbnail image data shown in FIG. 7(D) is read out of the thumbnail image area, and this thumbnail image data is written to the SDRAM 44 in a manner similar to the above.

Because the thumbnail area stores 1 line of thumbnail image data, the processing the thumbnail read request by once results in writing of 1-line thumbnail image data onto the SDRAM 44. Such writing of thumbnail image data is carried out at an interval of 8 lines. In other words, each time 640 pixels×8 lines of original image data are written to the SDRAM 44, 80 pixels×1 line of thumbnail image data are written to the SDRAM 44. Accordingly, writing is completes on 64 pixels×480 lines of original image data as well as 80 pixels×60 lines of thumbnail image data, before elapsing a 1-frame time period from depressing the shutter button 70.

Incidentally, the thumbnail image data is written to the SDRAM 44 during a horizontal blanking period shown in FIG. 7(A). Consequently, the writing of thumbnail image data has no adverse effect upon the writing of original image data.

Figure 2:
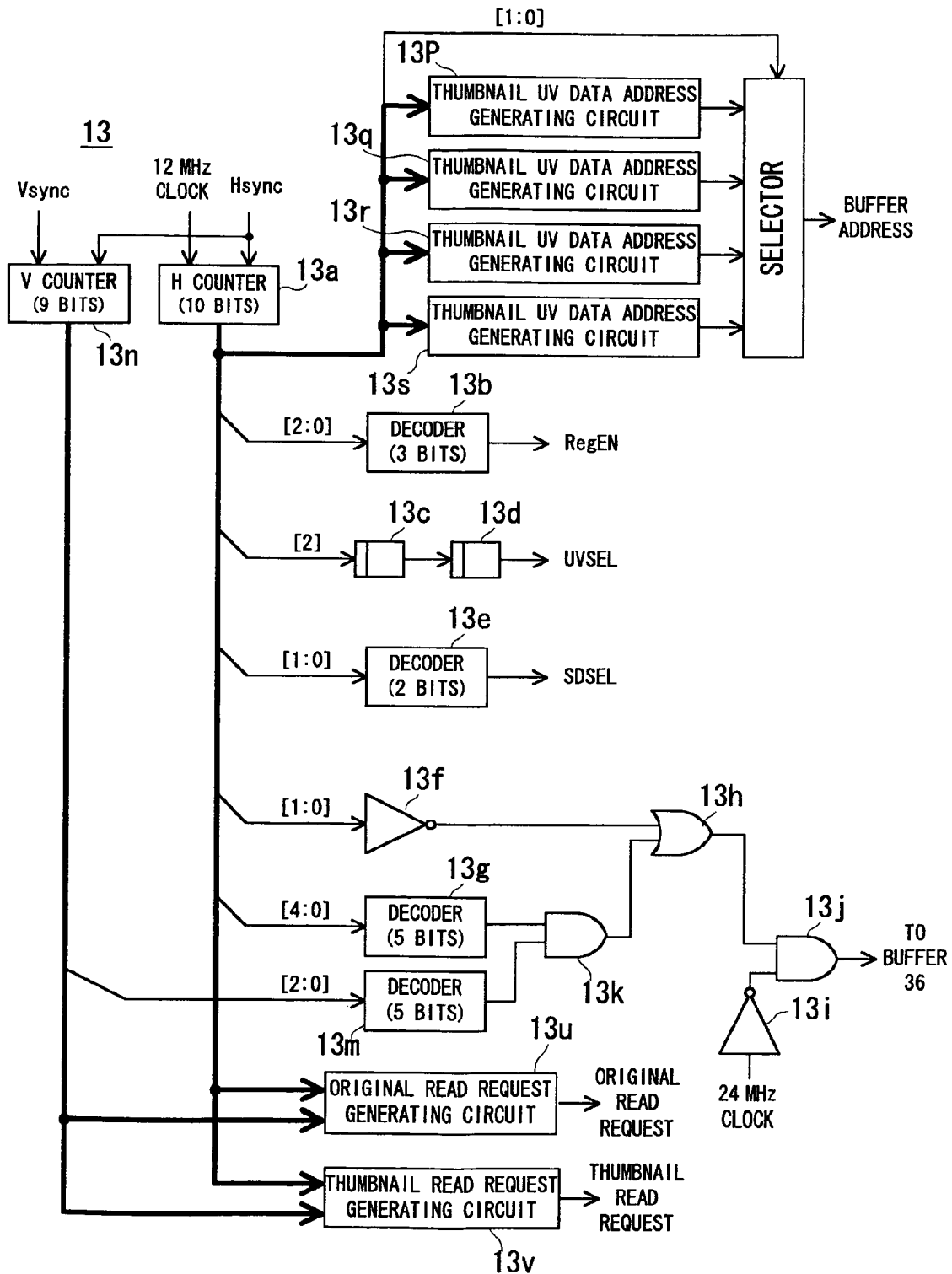
FIG. 2 is a block diagram showing one part of a timing generator.

The timing generator 13 is configured as shown in FIG. 2. An H counter 13*a* is incremented responsive to the 12-MHz clock and reset by the horizontal synchronizing signal. That is, the H counter 13*a* counts the horizontal number of pixels of the original image data. The H counter 13*a* has a count value represented by 10 bits. The lower 3 bits [2:0] of such a count value is inputted to a decoder 13*b*, and a lower third bit [2] is inputted to D-FF circuit 13*c*. Also, lower 2 bits [1:0] are inputted to a decoder 13*e* and inverter 13*f*, and lower 5 bits [4:0] are inputted to a decoder 13*g*.

The decoder 13*b*, when the 3-bits input data represents "1", has a high output level. Such an output of the decoder 13*b* is used as an enable signal RegEN. Also, the lower third bit data inputted to the D-FF circuit 13*c* is outputted as a select signal UVSEL through a next-stage D-FF circuit 13*d*. The decoder 13*e*, when its 2-bits input data represents "0", "1", "2", and "3", creates select signals SDSEL respectively representing "0", "2", "1" and "3". As a result, the enable signal RegEN varies as shown in FIG. 4(F), the select signal UVSEL as shown in FIG. 4(G), and the select signal SDSEL as shown in FIG. 4(J).

The inverter 13*f* inverts its input data, and the decoder 13*g* outputs a high level signal when its 5-bit data represents "25"-"28". Also, the inverter 13*i* inverts the 24-MHz clock. A V counter 13*n* is incremented responsive to the horizontal synchronizing signal and reset by the vertical synchronizing signal. That is, the V counter 13*n* counts the vertical number of lines of the original image data. The V counter 13*n* has a count value represented by 9 bits. Among these, the lower 3 bits [2:0] are inputted to a decoder 13*m*. The decoder 13*m* outputs a high level signal only when this input represents "1". That is, the output of the decoder 13*m* becomes high in level every 8 lines.

The outputs of the decoders 13*g* and 13*m* are ANDed by an AND circuit 13*k*. The AND circuit 13*k* has an output which is ORed with an output of the inverter 13*f* by an OR circuit 13*h*. Further, the OR circuit 13*h* has an output which is ANDed with an output of the inverter 13*i* by an AND circuit 13*j*. As a result, a write enable signal shown in FIG. 4(M) is obtained from the AND circuit 13*j*, being outputted to the buffer 36.

Address generating circuits 13*p*-13*s* determine respective write addresses of the original Y data, the original UV data, the thumbnail Y data and the thumbnail UV data based on count values of the H counter 13*a*, and input the address signals to a selector 13*t*. The selector 13*t* also receives the lower 2 bits of the H counter 13*a* count value as a control signal, and selects any of the address signals. That is, when the control signal shows "0", it selects an output of the address generating circuit 13*p*. When the control signal shows "2", an output of the address generating circuit 13*q* is selected. Also, when the control signal represents "1", an output of the address generating circuit 13*r* is selected. When the control signal represents "3", an output of the address generating circuit 13*s* is selected. As a result, the address signal varies as shown in FIG. 4(L).

In this manner the original image data and thumbnail image data are written to a predetermined address in accordance with the write enable signal and address signal given from the timing generator 13 to the buffer 36.

Read request generating circuits 13*u* and 13*v* receive both count values of the H counter 13*a* and the V counter 13*m*, and output respective original read request and thumbnail read request in predetermined timing. Explaining in more detail, the read request generating circuit 13*u* outputs an original read request whenever the H counter 13*a* counts 64 pixels on each line. On the other hand, the read request generating circuit 13*v* outputs a thumbnail read request each time the V counter 13*m* counts 7 lines and the H counter 13*a* counts 640 pixels. As a result original read requests are outputted at an interval of 64 pixels as shown in FIG. 7(B). Also, a thumbnail read request is outputted simultaneous with a 10-th original read request on a predetermined line.

If 1 screen of original image data and thumbnail image data is obtained within the SDRAM 44, a JPEG compression/decompression circuit 48 shown in FIG. 1 sends write and read requests to the memory control circuit 40. The write request is to demand writing of original image data and thumbnail image data onto the buffer 46, while the read request is to demand reading of compressed data written on the buffer 50. Accordingly, requests are given in the order of a write request and a read request.

The mediation circuit 40*a* receives a write request via the RS-FF circuit 40*d* and supplies a corresponding start signal to the processing circuit 40*f*. A buffer control circuit 40*g* shown in FIG. 6 makes the chip select signal CS2 low in level and reads original image data from the SDRAM 44 in a procedure similar to the above. The read original image data is outputted to the buffer 46 via the D-FF circuits 40*r*-40*v* and 3-state buffer 40*p*. The buffer control circuit 40*g* also outputs the address signal and write enable signal to the buffer 46. Due to this, the original image data is written to a predetermined address of the buffer 46.

The JPEG compression/decompression circuit 48 performs JPEG compression on the original image data written on the buffer 46 and writes the compressed data to a buffer 50. In this manner, the compressed data stored in the buffer 50 is read out by the memory control circuit 40 in response to a read request from the JPEG compression/decompression circuit 48, being again written to the SDRAM 44.

That is the mediation circuit 40*a* inputs a predetermined start signal to the processing circuit 40*f* in response to a read request outputted through the RS-FF circuit 40*e*. Receiving this, the buffer control circuit 40*g* of FIG. 6 makes a chip select signal CS3 low in level and outputs an address signal to the buffer 50. Also, the SDRAM control circuit 40*h* brings the 3-state buffer 49 to an on state and inputs the address signal, the RAS signal and the CAS signal in predetermined timing to the SDRAM 44. Due to this, the compressed data stored in the buffer 50 is stored to predetermined address of the SDRAM 44.

Such a process is made also on the thumbnail image data. As a result, 1 screen of compressed data of both the original image and thumbnail image is obtained in the SDRAM 44.

The CPU 56 fetches this compressed data via a bus bridge 52 and bus 54 and writes it to a DRAM 58. The CPU 56 thereafter records this compressed data onto a memory card 66 through an I/F circuit 60.

According to this embodiment, each time 8-lines original image data bas been written to the SDRAM 44, 1 line of associated thumbnail image data is written to the SDRAM 44. Accordingly, it is possible to complete the writing of 1-screen original image data and 1-screen thumbnail image data within a 1-frame period. Furthermore, the memory control circuit 40 has a processing speed of 24 MHz which is 4 times the processing speed of the signal processing circuit 18. Consequently, the original image data and thumbnail image data can be compressed and recorded to the memory card 66 in concurrent with their writing to the SDRAM. As a result, in concurrent with continuous writing the original image data and thumbnail image data of each frame to the SDRAM 44, the compressed data of each frame can be recorded in a continuous fashion to the memory card 66. In other words, it is possible to record to the memory card 66 an original motion image comprising a plurality of frames of original still pictures and a thumbnail motion image comprising a plurality of frames of thumbnail still pictures.

In this embodiment the thumbnail image data was written line by line to the SDRAM 44 by utilizing a horizontal blanking period. Alternatively, the writing of the thumbnail image data to the SDRAM 44 may be performed every a plurality of lines. In such a case, it is required to increase the capacity of the thumbnail area in order to store a plurality of lines of thumbnail image data. Also, the capacity of the thumbnail area can be increased to 80 pixels×60 lines so that 1 screen of thumbnail image data is collectively written to the SDRAM 44 within a vertical blanking period.

Meanwhile, in this embodiment explanation was based on the CCD imager of a progressive scan scheme. This invention, however, is applicable to a digital camera using any of an image sensor of a raster scan scheme. Due to this, an interlace scan method may be adopted in place of the progressive scan method. Also, a CMOS image sensor may be adopted instead of a CCD imager.

Furthermore, the memory card may use a various type of a card including SSFDC (Solid State Floppy Disc Card). Also, in this embodiment explanation was made using a primary color filter arranged in mosaic form with R, G and B. Alternatively, a complementary color filter may be used which is formed by Ye, Cy, Mg and G arranged in a mosaic form. Furthermore, the main memory can use something other than SDRAM provided that burst transfer is possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:
an imaging device for imaging a subject and outputting first image data having a first resolution;
a generator for generating second image data having a second resolution which is lower than the first resolution based on the first image data outputted from said imaging device; and
a writer for intermittently writing to a first memory the first image data outputted from said imaging device, and writing the second image data generated by said generator to said first memory at intervals of writing of the first image data, wherein said imaging device outputs the first image data in a raster scan manner, and said writer writes the second image data to said first memory during a horizontal blanking period of the first image data.

2. A digital camera, comprising:
an imaging device for imaging a subject and outputting first image data having a first resolution;
a generator for generating second image data having a second resolution which is lower than the first resolution based on the first image data outputted from said imaging device;
a writer for intermittently writing to a first memory the first image data outputted from said imaging device, and writing the second image data generated by said generator to said first memory at intervals of writing of the first image data, wherein said imaging device outputs the first image data in a raster scan manner, and said writer writes the second image data to said first memory during a horizontal blanking period of the first image data; and
a vertical counter to count the number of pixels of the first image data outputted from said imaging device in a vertical direction so as to output a vertical count value,
wherein the first image data has horizontal lines of a first number, the second image data has horizontal lines of a second number which is smaller than the first number, and said writer writes to said first memory, at every time the first image data corresponding to horizontal lines of a third number which is smaller than the first number is written to said first memory, the second image data corresponding to horizontal lines of a fourth number which is smaller than the second number,
wherein the horizontal lines of the fourth number forming the second image data corresponds to the horizontal lines of the third number forming the first image data.

3. A digital camera according to claim 2, wherein, said generator includes an extractor for extracting pixel data from the first image data based on the vertical count value.

4. A digital camera according to claim 3, wherein said extractor includes a plurality of registers for shifting the first image data at every predetermined amount, and an activator for intermittently activating said plurality of registers based on the vertical count value.

5. A digital camera according to claim 2, further comprising a second memory for holding the second image data generated by said generator, wherein said writer transfers the second image data corresponding to the horizontal lines of the fourth number from said second memory to said first memory when said vertical counter has counted the third number.

* * * * *